United States Patent [19]
Rae et al.

[11] Patent Number: 5,896,262
[45] Date of Patent: Apr. 20, 1999

[54] ARC FAULT DETECTOR WITH PROTECTION AGAINST NUISANCE TRIPS AND CIRCUIT BREAKER INCORPORATING SAME

[75] Inventors: Thomas Christopher Rae, Irwin; Thomas Edward Natili, Cabot; Robert Tracy Elms, Monroeville, all of Pa.

[73] Assignee: Eaton Corporation, Cleveland, Ohio

[21] Appl. No.: 09/030,990

[22] Filed: Feb. 26, 1998

[51] Int. Cl.$^6$ ............................................. H02H 3/16
[52] U.S. Cl. ........................................... 361/94; 361/42
[58] Field of Search .............................. 361/93, 94, 42, 361/78, 87, 102; 324/76.41, 76.44, 76.45

[56] References Cited

U.S. PATENT DOCUMENTS

| | | | |
|---|---|---|---|
| 3,996,499 | 12/1976 | Gary et al. | 317/36 TD |
| 5,224,006 | 6/1993 | MacKenzie et al. | 361/45 |
| 5,307,230 | 4/1994 | MacKenzie | 361/96 |
| 5,519,561 | 5/1996 | Mrenna et al. | 361/105 |
| 5,682,101 | 10/1997 | Brooks et al. | 324/536 |
| 5,691,869 | 11/1997 | Engel et al. | 361/42 |
| 5,706,159 | 1/1998 | Dollar, II et al. | 361/113 |
| 5,805,398 | 9/1998 | Rae | 361/42 |

*Primary Examiner*—Sally C. Medley
*Attorney, Agent, or Firm*—Martin J. Moran

[57] ABSTRACT

An arc fault detector of the type which generates a trip signal when a time attenuated accumulation of pulses produced each time an arc is struck reaches a selected value, includes a pulse conditioner which discriminates against false trips induced by phenomena such as tungsten bulb burn out and turn on of a cold tungsten bulb controlled by a dimmer. The pulse conditioner includes a zener diode which limits the amplitude of the pulses applied to the integrator, and stretches all of the pulses to reduce the variation in pulse duration. The latter can be accomplished by a peak detector which stretches pulses which reach the zener limit to a duration of at least about a half cycle.

20 Claims, 1 Drawing Sheet

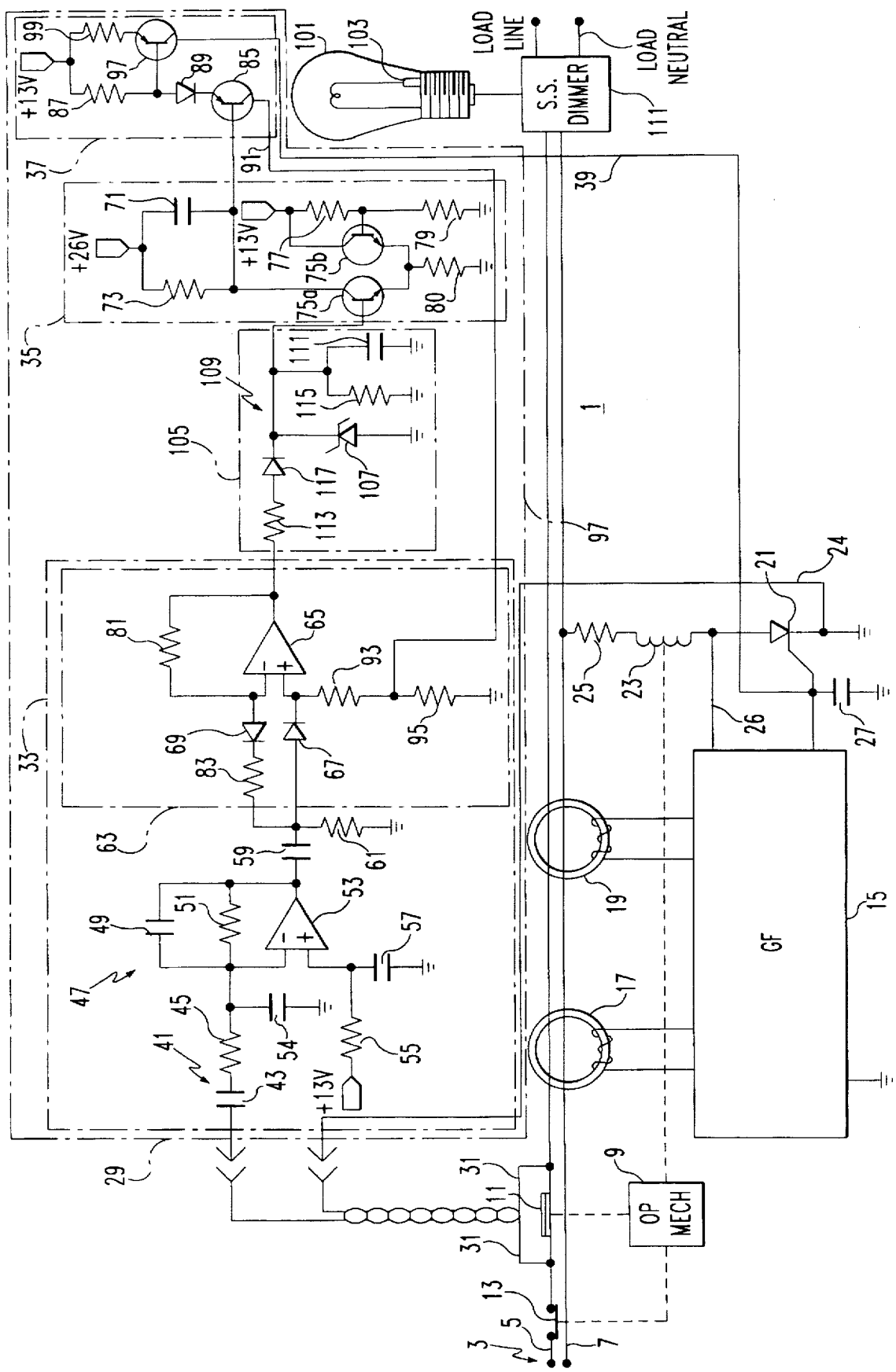

ARC FAULT DETECTOR WITH PROTECTION AGAINST NUISANCE TRIPS AND CIRCUIT BREAKER INCORPORATING SAME

BACKGROUND OF THE INVENTION

1. Field of the Invention

This invention relates to detection and interruption of currents and circuits experiencing arc faults. More particularly, it relates to an arc fault detector and a circuit breaker incorporating such an arc fault detector which minimize the effects of other phenomena such as the burnout of tungsten bulbs, which can falsely provide an indication of an arc fault.

2. Background Information

Arc faults can occur in electrical systems for instance between adjacent bared conductors, between exposed ends of broken conductors, at a faulty connection, and in other situations where conducting elements are in close proximity. Arc faults in ac systems can be intermittent as the magnetic repulsion forces generated by the arc current force the conductors apart to extinguish the arc. Mechanical forces then bring the conductors together again so that another arc is struck.

Arc faults typically have high resistance so that the arc current is below the instantaneous or magnetic trip thresholds of conventional circuit breakers. Also, the intermittent nature of an arc fault can create an average RMS current value which is below the thermal threshold for such circuit breakers. Even so, the arcs can cause damage or start a fire if they occur near combustible material. It is not practical to simply lower the pickup currents on conventional circuit breakers as there are many typical loads which draw similar currents, and would therefore, cause nuisance trips.

Much attention has been directed toward trying to distinguish arc currents from other intermittent currents. It has been recognized that arc currents generate a step increase in current when the arc is struck. However, many typical loads generate a similar step increase, such as for instance when the device is turned on. In many instances, the step increases generated by these loads are singular events while an arc fault generates a series of step increases. The arc fault detector described in U.S. Pat. No. 5,224,006 counts the step increases in current and generates a trip signal if a selected number of step increases occur within a given interval. However, there are loads, such as a solid state dimmer switch with the firing angle phased back substantially, which also generate repetitive step increases in current. This problem is addressed by the arc fault detector in U.S. Pat. No. 5,691,869 in which the arc current is passed through a bandwidth limited filter which generates pulses having an amplitude proportional to the step increases. An arc indication is generated when a time attenuated accumulation of these pulses reaches a predetermined value. Thus, a few very large magnitude step increases within a period of time, or a larger number of more modest step increases within a similar time period, generate a trip signal. The trip level can be set so that the cyclic pulses generated by a dimmer do not generate the time attenuated accumulation which reaches the trip level.

There is at least one arc condition which can occur in a protected circuit to which it is desired that the arc fault circuit not respond. This is an arc created by the burnout of a tungsten filament such as in a light bulb. When the filament burns through, a small gap is created between the burned out ends of the filament. An arc is struck across this gap and can quickly envelop the entire filament so that it extends between the two conductors thereby drawing a very large arc current. In order to terminate this arc, tungsten bulbs are provided with a small fuse in the base. Even so, burnout of the filament and blowing of the fuse results typically in a pair of current pulses of opposite polarity. This pair of pulses can be of sufficient magnitude that the threshold value of the time attenuated accumulation of pulses in the circuit breaker described in U.S. Pat. No. 5,691,869 is exceeded and the circuit breaker is tripped. This is considered a nuisance trip as the fuse has interrupted the arc.

Tungsten filament bulbs can also generate false trips when used with a dimmer. As mentioned, a dimmer which is phased back can generate repetitive step increases in current on each half cycle. As also discussed, the circuit breaker can be set so that the threshold of the time attenuated accumulation of pulses generated by the dimmer do not reach the trip level with normal loads. However, when a tungsten filament lamp is first turned on, the cold filament has a very low resistance and can draw up to fifteen times normal current. This can result in a nuisance trip when a tungsten lamp controlled by a dimmer switch is first turned on.

Commonly owned U.S. patent application Ser. No. 08/939,976 filed on Sep. 29, 1997, addresses the problems created by a tungsten filament bulb by disclosing an arc fault detector in which a zener diode places amplitude limits on pulses having an amplitude proportional to the magnitude of step increases in current in the protected circuit so that the time attenuated accumulation of these pulses does not reach the trip level based upon a few very large pulses which can be generated by burnout of a tungsten lamp or turn on of a tungsten lamp controlled by a dimmer switch. In particular, the zener diode clips the pulses generated in response to the step increases in current in the protected circuit before the time attenuated accumulation of the pulses. As true arc faults will continue to strike at a random rate, and therefore raise the time attenuated accumulation of pulses to the trip threshold, false trips due to burnout of a tungsten lamp or turn on of a cold tungsten bulb are avoided. While the arc detector described in the cited patent application reduces false trips due to tungsten lamp burnout and turn on of dimmer controlled tungsten bulbs, there is room for improvement.

There is a need for an arc fault detector and circuit breaker incorporating such a detector which can respond faster to true arc faults, yet not falsely trip on other phenomena such as burnout of a tungsten bulb or turn on of a tungsten bulb controlled by a dimmer.

There is a need for achieving such a result with a simple, reliable and low cost detector.

In particular there is a need for such apparatus which can respond sooner to step increases in current in a protected circuit, whether small or large and yet discriminate against current discontinuities caused by tungsten bulbs.

SUMMARY OF THE INVENTION

These needs and others are satisfied by the arc fault detector and circuit breakers incorporating such arc fault detectors which are derived from recognition that pulses generated by tungsten bulbs are normally not only large in amplitude, but are also longer in duration than the pulses generated by true arc faults. Thus, in an arc fault detector in which a pulse generator generates a pulse signal containing pulses related in amplitude to step increases in current each time an arc is struck and containing pulses related in amplitude to other current pulses such as can be generated by a tungsten bulb, and means generating a trip signal as a function of a time attenuated accumulation of the pulses, pulse conditioning means is provided which not only limits the amplitude of the pulses generated by the pulse generator but also stretches the pulses generated by the pulse generating means to reduce variations in duration of the pulses that are applied to the means generating the trip signal. By reducing the variations in pulse duration, the disproportionate effect of the pulses generated by a tungsten bulb over pulses generated by a true arc fault are reduced.

The trip means which generates a time attenuated accumulation of the conditioned pulses only responds to conditioned pulses having an amplitude above a predetermined threshold amplitude. The pulse conditioning means limits the amplitude of the conditioned pulses to a selected amplitude which is above the threshold amplitude. Preferably, the peak detector has a time constant which is selected to provide a predetermined pulse duration for a conditioned pulse to decay in amplitude from the selected amplitude to the predetermined threshold amplitude. Preferably, this predetermined pulse duration is about one half cycle of the ac system.

In a preferred form, the peak detector comprises a peak detector capacitor to which pulses from the pulse generating means are applied through a first resistor and a second resistor shunting the capacitor. In addition, a diode between the pulse generating means and the peak detector capacitor prevents discharge of the capacitor through the pulse generating means. Also preferably, the means limiting the conditioned pulses to the selected amplitude is a zener diode connected in parallel with the peak detector capacitor between the first resistor and the peak detector capacitor.

BRIEF DESCRIPTION OF THE DRAWING

A full understanding of the invention can be gained from the following description of the preferred embodiment when read in conjunction with the accompanying drawing which is a schematic diagram of an arc fault circuit breaker incorporating the invention.

DESCRIPTION OF THE PREFERRED EMBODIMENT

The FIGURE illustrates an arc fault circuit breaker 1 in accordance with the invention providing protection for an electrical circuit 3 which includes a line conductor 5 and a neutral conductor 7. The circuit breaker 1 provides overcurrent and short circuit protection, arc fault protection and ground fault protection for the electrical system 3. Overcurrent and short circuit protection are provided by the conventional thermal-magnetic trip mechanism (not shown) which includes a bimetal 11. As is well known, the bimetal responds to persistent overcurrent conditions to actuate a spring-powered operating mechanism 9 to open a set of separable contacts 13 connected in series with the line conductor 5 to interrupt current flow in the electrical system.

Ground fault protection is provided by a ground fault circuit 15. Such circuits are well known in the art. The ground fault circuit 15 shown is the well known dormant oscillator type which utilizes two sensing coils 17 and 19 which sense current in the line and neutral conductors 5 and 7. In response to a line to ground or a neutral to ground fault, the ground fault circuit 15 generates a ground fault trip signal which turns on the silicon controlled rectifier (SCR) 21. This energizes a trip solenoid 23 connected by the SCR 21 between the neutral conductor 7 and circuit breaker common which is referenced to the line conductor through the lead 24. A resistor 25 limits the current through the coil 23 and a capacitor 27 protects the gate of the SCR 21 from being falsely tripped on noise. Energization of the shunt trip coil 23 actuates the spring-powered operating mechanism 9 to open the separable contacts 13. Current is drawn through the coil 23 to provide power to the ground fault circuit 15 through the lead 26. However, this current is insufficient to actuate to the trip coil.

Arc fault protection is provided by an arc fault circuit 29. This arc fault circuit 29 utilizes a pair of leads 31 connected across the bimetal 11 to sense current in the protected electrical system 3. As taught by U.S. Pat. No. 5,519,561, as the resistance of the bimetal 11 is known, the voltage drop across this bimetal provides a measure of the current flowing in the line conductor 5. The arc fault circuit 29 also includes a pulse generator 33, a circuit 35 which provides a time attenuated accumulation of the pulses generated by the pulse generator 33, and an output circuit 37 which provides a trip signal which through the lead 39 turns on the SCR at 21 to open the separable contacts 13 in the same manner as the ground fault circuit 15.

The pulse generator 33 includes a high pass filter 41 formed by the series connected capacitor 43 and resistor 45, followed by a low pass filter 47 formed by the parallel connected capacitor 49 and resistor 51. The high pass filter 41 and low pass filter 47 have a band pass in a range which generates pulses in response to the step increases in current caused by striking of an arc and yet is below any carrier frequencies that may be on the power line. In the exemplary circuit, this pass band is in a range of about 290 to 1,540 Hz for the 3 db points and could go up to 10 KHz or more.

An operational amplifier (op amp) 53 provides gain for the pulses. A capacitor 54 reduces high frequency noise in the pulses. The op amp 53 is biased at its non-inverting input by a 13 vdc supply voltage. A resistor 55 and capacitor 57 delay application of the bias to prevent false trip signals during power up. The positive and negative pulses generated by the band pass filter ride on the plus 13 vdc volt bias applied to the op amp 53. This bias is removed by the ac coupling capacitor 59 which along with the resistor 61 forms another high pass filter stage. The bi-polar pulse signal resulting is rectified by a rectifier circuit 63 which includes another op amp 65. Positive pulses are applied to the non-inverting input of the op amp 65 through the diode 67 while negative pulses are applied to the inverting input through the diode 69. The output of the op amp 65 is a pulse signal having pulses of a single polarity.

The circuit 35 generates a time attenuated accumulation of the pulses in the pulse signal generated by the pulse generator 33. The pulses are accumulated on a capacitor 71 connected to the 26 vdc supply. A bleed resistor 73 connected across the capacitor provides the time attenuation. The pulses are applied to the capacitor 71 through a differential amplifier formed by the pair of transistors 75a and 75b. When no pulses are generated, both electrodes of the capacitor 71 are at 26 volts. The pulses from the pulse generator 33 provide base drive current for the transistor 75a. A voltage divider formed by the resistor 77 and 79 connected at their midpoint to the base of the transistor 75b set the minimum amplitude for the pulses to turn on the transistor 75a. In the absence of pulses, the transistor 75b is on which holds the transistor 75a off due to the voltage developed across the resistor 80. When the amplitude of a pulse exceeds the threshold, the transistor 75a is turned on (which turns the transistor 75b off). This threshold is selected so that pulses which could be generated by some normal loads, such as for instance a dimmer switch operating at normal loads, are not accumulated. The amplitude of the pulses is set by the gain of the op amp 65 which in turn is determined by the ratio of the feed back resistor 81 and input resistor 83. The amplitude and duration of each pulse determine the amount of charge which is applied to the capacitor 71. The successive pulses are accumulated through the summation of the charge they add to the capacitor 71. The resistor 73 continuously bleeds the charge on the capacitor 71 with a time constant determined by the values of the capacitor 71 and resistor 73 to time attenuate the accumulation of the pulses. It can be appreciated that the magnitude and time interval between pulses determines the instantaneous voltage that appears across the capacitor 71.

The output circuit 37 monitors the voltage across the capacitor 71 representing the time attenuated accumulation of the pulses in the pulse signal generated by the pulse generator. Each pulse lowers the voltage on the capacitor which is applied to the base of a transistor 85 in the output circuit. A voltage is applied to the emitter of the transistor 85 by the 13 vdc supply through a resistor 87 and diode 89. With no pulses being generated, the voltage on the base of the transistor 85 is 26 volts. Without the diode 89, the 13 volt reverse bias would destroy the base to emitter junction of the transistor 85. The diode 89 withstands this voltage. When the voltage at the lower end of the capacitor 71, and therefore on the base of the transistor 85, falls below the 13 volts minus the forward drop across the diode 89, the transistor 85 is turned on. Feedback provided through the lead 91 and the resistors 93 and 95 holds the transistor 85 on by providing a continuous output of the op amp 65 which holds the transistor 75a on. Turn on of the transistor 85 provides base drive current for the transistor 97 which draws current limited by the resistor 99 to generate an arc fault trip signal which turns on the SCR 21 and trips the separable contacts 13 open.

The larger the pulses in the pulse signal generated by the pulse generator 33 the harder the transistor 75a is turned on, and hence, the faster charge is accumulated on the capacitor 71. As mentioned, burnout of a tungsten bulb 101 energized by the electrical system 3 protected by the circuit breaker 1 can generate, typically, two large amplitude pulses in consecutive half cycles which can by themselves accumulate sufficient charge on the capacitor 71 to reduce the voltage on the base of the transistor 85 to the threshold voltage which generates the trip signal. As also mentioned, turn on of a cold tungsten bulb controlled by a dimmer can also produce large initial pulses which can accumulate sufficient charge on the capacitor 71 to generate a trip signal.

In order to discriminate against tungsten bulb burn out, since such a condition is addressed by a fuse 103 in the bulb 101, and to eliminate false arc indications due to turn on of a cold tungsten bulb controlled by a dimmer, a pulse conditioner 105 is provided which modifies the pulses output by the full wave rectifier 63. This pulse conditioner 105 conditions the pulses in two respects. First, it limits the amplitude of the pulses and second, it stretches the pulses to reduce variations in pulse duration. As the pulses generated by the two tungsten bulb phenomena tend to be greater in amplitude and wider than the pulses generated by true arcs, this conditioning of the pulses reduces the contribution to charge accumulation on the capacitor 71 produced by the tungsten bulb effects. As tungsten bulb burn out typically only produces two pulses and cold turn on of the tungsten bulb only produces a couple of large pulses before the filament warms up, while true arcs continue to randomly generate pulses, the parameters can be set to ignore tungsten bulb phenomena and still respond quickly to arc faults.

Limiting of pulse amplitude is provide by a zener diode 107. The breaker over voltage of the zener diode 107 is selected to be above the threshold voltage required to turn on the transistor 75a but less than the amplitude that is typically generated by tungsten bulb burn out or cold turn on. Stretching of the pulses is provided by pulse stretching circuit 109. The pulse stretching circuit 109 includes a capacitor 111 connected between the output of the pulse generator 33 and ground. The pulses from the pulse generator are applied to the capacitor 111 through a first resistor 113. A second resistor 115 connected in shunt bleeds charge from the capacitor 111. A diode 117 prevents discharge of the capacitor 111 back through the rectifier 63 of the pulse generator. This pulse stretching circuit 109 forms a peak detector having a time constant which is determined by the values of the capacitor 111 and the resistor 115. This time constant is selected such that a pulse from the pulse generator 35 having an amplitude equal to the selected limiting voltage set by the zener diode 107 will decay to the threshold voltage set by the resistors 77 and 79 in about one half cycle, i.e., about 8.3 milliseconds in a 60 cycle system. In the exemplary embodiment of the invention, the time constant was selected to be about 23 milliseconds. This time constant, combined with the clipping provided by the zener diode 107 and the threshold set by the resistors 77 and 79 stretches a 70 amp peak arc current to about a full half cycle of integration conduction on the capacitor 71. Tungsten bulb burn out produces a pair of pulses one half cycle apart which are much larger than the limit set by the zener diode, e.g., about twice as large. These pulses also have a certain time that they remain above the clipping voltage so that the capacitor 111 remains charged and only begins to discharge when the pulse voltage falls below the clipping voltage set by the zener diode 107. Therefore, a pulse generated by tungsten burn out will tend to last longer than a half cycle by the time that it remains above the clipping voltage. With the two pulses generated by tungsten burn out occurring one half cycle apart, the second pulse will occur before the first pulse has decayed to the threshold voltage, and hence the integration capacitor 71 will be continuously charged until the second pulse terminates. The total integration time for these pulses will be two half cycles plus the additional time that the second pulse remains above the clipping voltage.

On the other hand, the clipping voltages selected while the two pulses produced by tungsten bulb burn out will generate more integrating current for the capacitor 71 than two pulses generated by arc faults, the trip circuit can be set to trip on a third arc fault pulse which has an amplitude of at least about the clipping voltage. Pulses generated by the step changes in current produced by smaller arc faults which exceed the threshold voltage but not the clipping voltage are also stretched, but not to a full half cycle. However, since the pulses generated by a tungsten bulb are not stretched proportionately as much as pulses generated by arc faults, the arc fault detector of the invention can be made to trip sooner on arc faults without generating false trips in response to tungsten bulb burn out and cold turn on when dimmer controlled.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker for interrupting current in an ac electrical system subject to arc faults generating step increases in current each time an arc is struck and subject to other current pulses of at least a certain high amplitude, said circuit breaker comprising:

separable contacts which interrupt said current in said electrical system when open; and trip means comprising pulse generating means generating a pulse signal containing pulses related in amplitude to said step increases in current each time an arc is struck and containing pulses related in amplitude to said other current pulses, pulse conditioning means comprising means limiting amplitude of said pulses to a selected amplitude which is less than said certain amplitude and pulse stretching means stretching said pulses to reduce variations in duration of said pulses to generate conditioned pulses, means generating a trip signal as a function of a time attenuated accumulation of said conditioned pulses, and means responsive to said trip signal to open said separable contacts.

2. The circuit breaker of claim 1 wherein said pulse stretching means comprises means stretching pulses generated by said pulse generating means having an amplitude at least as great as said selected amplitude to conditioned pulses having a duration of at least about one half cycle of said ac electrical system.

3. The circuit breaker of claim 1 wherein said pulse stretching means comprises a peak detector.

4. The circuit breaker of claim 3 wherein said means generating a trip signal as a function of a time attenuated accumulation of said condition pulses comprises means only accumulating conditioned pulses which exceed a predetermined threshold amplitude.

5. The circuit breaker of claim 4 wherein said peak detector has a time constant selected to provide a predetermined pulse duration for a conditioned pulse to decay in amplitude from said selected amplitude to said threshold amplitude.

6. The circuit breaker of claim 5 wherein said predetermined pulse duration is about one half cycle of said ac electrical system.

7. The circuit breaker of claim 4 wherein said peak detector comprises a peak detector capacitor to which pulses generated by said pulse generating means are applied, a first resistor through which said pulses from said pulse generating means are applied to said peak detector capacitor, and a second resistor shunting said peak detector capacitor.

8. The circuit breaker of claim 7 wherein said peak detector further includes a diode between said pulse generating means and said peak detector capacitor to prevent discharge of said peak detector capacitor through said pulse generating means.

9. The circuit breaker of claim 8 wherein said means generating a trip signal as a function of a time attenuated accumulation of said conditioned pulses comprises means only accumulating conditioned pulses which exceed a predetermined threshold amplitude and wherein said peak detector has a time constant selected to provide a predetermined pulse duration for a conditioned pulse to decay in amplitude from said selected amplitude to said threshold amplitude.

10. The circuit breaker of claim 9 wherein said predetermined pulse duration is about one half cycle of said ac electrical system.

11. The circuit breaker of claim 1 wherein said means limiting amplitude of said pulses to a selected amplitude comprises a zener diode.

12. Apparatus for detecting arc faults generating step increases in current each time an arc is struck in an electrical system which is also subject to other current pulses of at least a certain high amplitude, said apparatus comprising pulse generating means generating a pulse signal containing pulses related in an amplitude to said step increases in current each time an arc is struck and containing pulses related in amplitude to said other current pulses, pulse conditioning means comprising pulse stretching means stretching said pulses to reduce variations in duration of said pulses to generate conditioned pulses, and means generating an arc fault signal as a function of a time attenuated accumulation of said conditioned pulses.

13. The apparatus of claim 12 wherein said pulse conditioning means further comprises means limiting amplitude of said pulses to a selected amplitude which is less than said certain amplitude.

14. The apparatus of claim 13 wherein said pulse stretching means comprises a peak detector.

15. The apparatus of claim 14 wherein said means generating said arc fault signal as a function of a time attenuated accumulation of said conditioned pulses only responds to conditioned pulses having an amplitude above a predetermined threshold amplitude and wherein said peak detector has a time constant selected to provide a predetermined pulse duration for a conditioned pulse to decay in amplitude from said selected amplitude to said predetermined threshold amplitude.

16. The apparatus of claim 15 wherein said predetermined pulse duration is about one half cycle of said electrical system.

17. The apparatus of claim 14 wherein said peak detector comprises a peak detector capacitor to which pulses generated by said pulse generating means are applied, a first resistor through which said pulses from said pulse generating means are applied to said peak detector capacitor, a second resistor shunting said peak detector capacitor and a diode between said pulse generating means and said peak detector capacitor to prevent discharge of said peak detector capacitor through said pulse generating means.

18. The apparatus of claim 17 wherein said means limiting amplitude of said pulses to a selected amplitude comprises a zener diode.

19. The apparatus of claim 18 wherein said means generating an arc fault signal as a function of a time attenuated accumulation of said conditioned pulses only responds to conditioned pulses having an amplitude above a predetermined threshold amplitude, and wherein said peak detector has a time constant selected to provide a predetermined pulse duration for a conditioned pulse to decay in amplitude from said selected amplitude to said predetermined threshold amplitude.

20. The apparatus of claim 19 wherein said predetermined pulse duration is about one half cycle of said electrical system.

* * * * *